(No Model.) 2 Sheets—Sheet 1.
F. B. TYLER.
HORSE RESTRAINER.
No. 471,201. Patented Mar. 22, 1892.
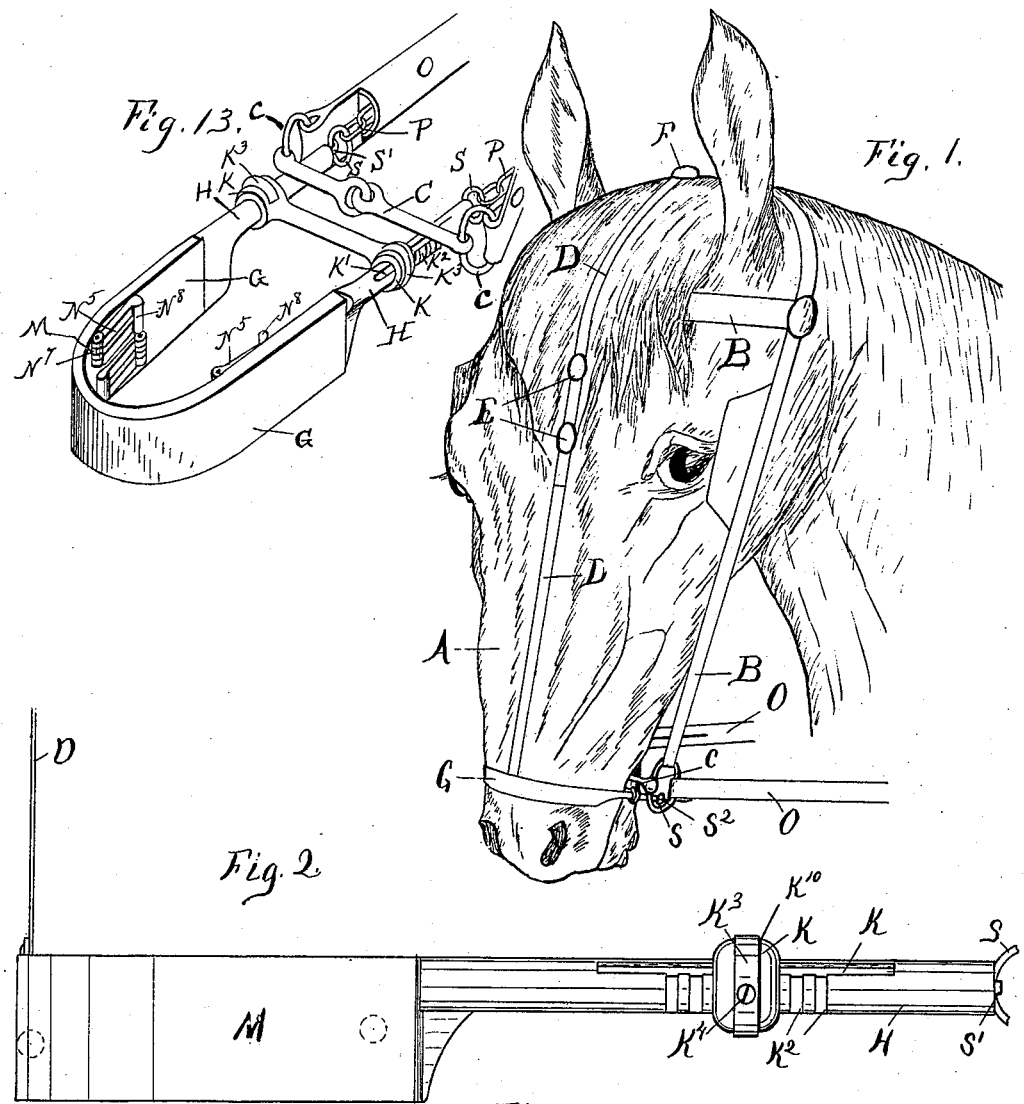
Witnesses
W. E. Gastman.
Julia Isler.
Inventor
Fred B. Tyler
by Francis W. Parker,
Attorney.

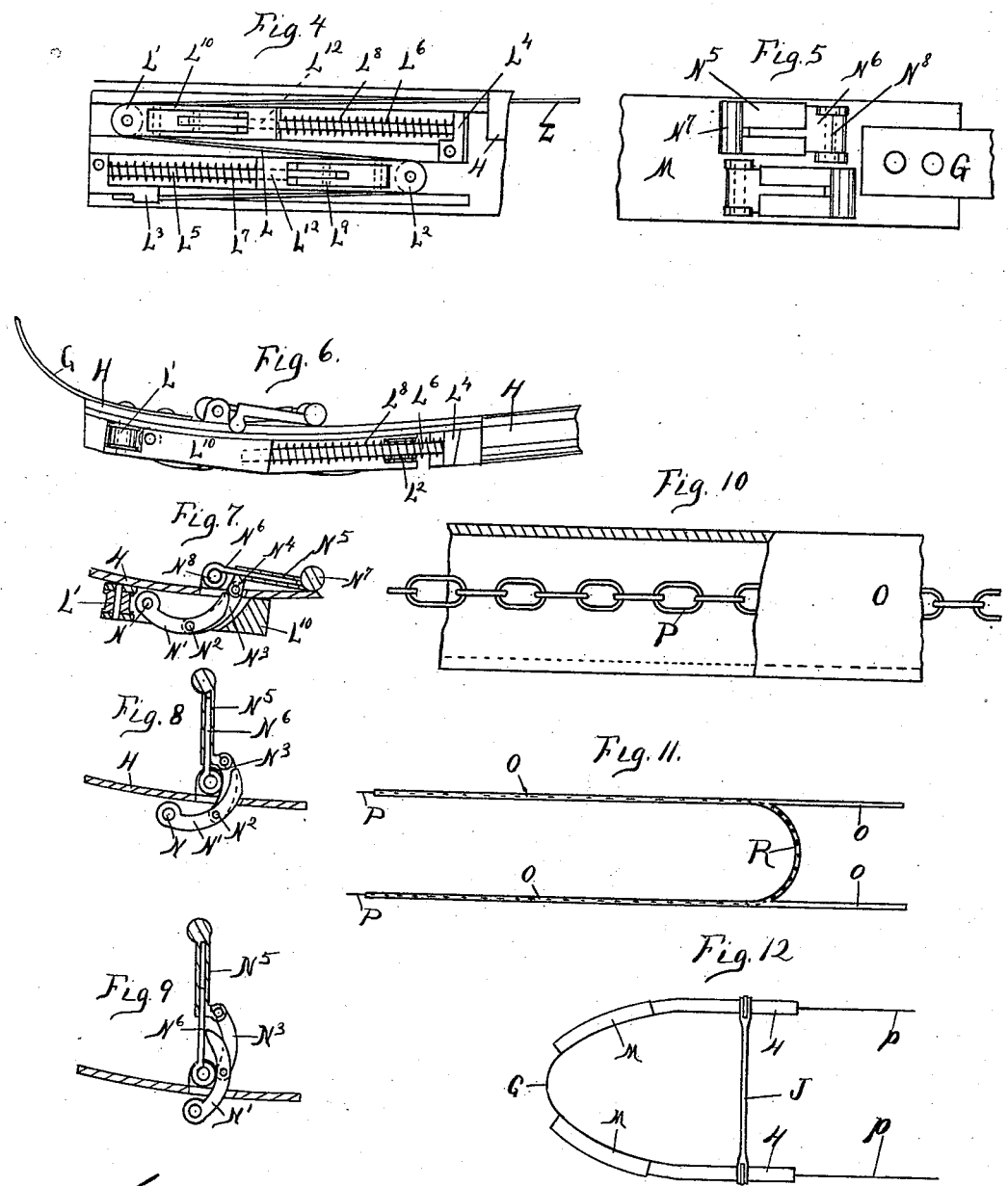

UNITED STATES PATENT OFFICE.

FRED B. TYLER, OF CHICAGO, ILLINOIS.

HORSE-RESTRAINER.

SPECIFICATION forming part of Letters Patent No. 471,201, dated March 22, 1892.

Application filed November 23, 1891. Serial No. 412,875. (No model.)

*To all whom it may concern:*

Be it known that I, FRED B. TYLER, a citizen of the United States, residing at Chicago, in the county of Cook and State of Illinois, have invented a new and useful Improvement in Horse-Restrainers, of which the following is a specification.

My invention relates to devices for restraining horses or for stopping runaway animals. It is illustrated in the accompanying drawings, wherein—

Figure 1 is a view of a horse's head with my device attached. Fig. 2 is a side view of the device detached. Fig. 3 is a cross-section through the mouth-piece. Fig. 4 is an interior view of the finger-operating mechanism. Fig. 5 is an exterior view of the folded fingers. Fig. 6 is a plan view of the parts with the casing removed. Fig. 7 is a detail horizontal view of one finger at rest. Fig. 8 is a detail showing the finger partly extended. Fig. 9 is a similar view showing the finger extended to its limit. Fig. 10 is a detail of a chain for controlling the device, which passes through the lines. Fig. 11 is a detail of the chain and lines at the vehicle. Fig. 12 is a plan view of the device. Fig. 13 is a perspective view of the restraining device, the ordinary driving-bit, and the connection of the controlling and driving lines in the position they occupy when in ordinary use.

Like parts are indicated by the same letter in all figures.

A is the horse's head, B the bridle-straps, and C the driving-bit for the control of the horse.

D is the forehead-band, composed of two sections adjustably connected at E E and secured one at F on the top of the horse's head and the other to the nose-band G. The nose-band is secured at each end to the frame-pieces H H, which are tubular toward their rear ends and carry the mouth-piece J, whose enlarged ends K encircle the tubular frame-pieces. Each frame-piece has a longitudinal slot $K'$ and circumferential slots $K^2$, and the enlarged end K has the thumb-band $K^3$ with the set-screw $K^4$, adapted to be rigidly screwed in or set in any slot $K^2$, or when the screw is loosened to be moved about so that the same shall enter the slot $K'$, and thus permit the mouth-piece to be moved to or from the nose-piece G. The forward ends of the piece H are enlarged to hold the operating mechanism.

Referring to Fig. 4, L is a cord which passes forward through the tubular portion of the frame and about the pulley $L'$, thence about the pulley $L^2$, and is finally made fast in the lug $L^3$, rigidly secured to the forward end of the enlarged portion of the frame-piece H, and a somewhat similar lug $L^4$ is fixed on the diagonally-opposite corner of the frame-piece. From each of these lugs but projecting in opposite directions are the guide-rods $L^5 L^6$, surrounded by the spiral springs $L^7 L^8$, adapted to force in opposite directions the slides $L^9 L^{10}$, with which the pulleys $L^2 L'$ are respectively associated. The guide-rods pass through apertures $L^{11} L^{12}$ in the ends of the slides. By pulling on the cord L it is evident that the slides will move in opposite directions against the spiral springs. There are four of these slides, two on each side, and each has associated with it a finger. A description of the construction and operation of one would be sufficient to illustrate all, and such construction and operation are illustrated in Figs. 6, 7, 8, and 9. The operating parts are preferably secured and concealed by the cases M M. Referring to the slide $L^{10}$, there is pivoted near its pulley, at N, the bifurcated finger $N'$, to which is pivoted, at $N^2$, between its outward portions the curved finger $N^3$, to the outer end of which is pivoted, at $N^4$, the sleeve $N^5$, which slides upon the finger $N^6$, and carries at its outer extremity the lug or roll $N^7$. The finger $N^6$ is pivoted at $N^8$ to the frame-piece H. In Fig. 8 the parts are shown in such position as they are brought after pulling a certain distance upon the cord L, which of course brings forward the slide $L^{10}$, thus bringing forward the finger $N'$ and throwing the finger $N^3$ into the position shown. This brings the finger $N^6$ and sleeve $N^5$ into a position substantially at right angles to that previously occupied. A further pulling upon the cord will bring the parts into the position indicated in Fig. 9. This motion of the finger and sleeve does not necessarily take place exactly as indicated; but the sleeve may be gradually moving inwardly as it is rising to a vertical position, though for convenience I have assumed that it passes to the vertical position before it moves outwardly.

O O are the driving-lines or reins, secured in the usual manner to the rings C′ of the driving-bit, and preferably formed hollow or tubular, as shown in Fig. 10, so as to permit the small controlling chain or strap P to pass therethrough, and the chain or strap may pass from the driving-lines through the loop R within convenient reach of the driver. This is shown diagrammatically in Fig. 11. The chains P P are connected with the cords L L in any convenient and suitable manner; but it is preferably done by interposing the ring S, to which the cord is attached at S′ and the chain at $S^2$.

It will be apparent that many changes could be made in the construction of these devices, and that they could be altered so as to depart from the method of operation shown without departing from the spirit of the invention.

A spring-washer $K^{10}$ may be used to keep the ring from moving, so as to avoid the necessity of tightly setting the set-screw. Either or both the set-screw and washer may be used to retain the parts in their proper positions.

The use and operation of my invention are sufficiently illustrated by the drawings and the descriptive matter hereinbefore set out. When the apparatus is applied as indicated in Figs. 1 and 13 and both the driving and controlling lines are carried back, as indicated in the diagrammatic view Fig. 11, the device is in condition to be used for restraining or controlling a horse. To adapt it to various horses, the mouth-piece is made adjustable, and by turning the ring and moving the screw along the longitudinal slot and then turning the ring so as to bring the screw into the circumferential slot on the frame-piece H the mouth-piece may be secured in position, as desired. When the horse becomes unmanageable, by pulling upon the controlling chain or lines in such manner as to draw the cords through the tubular portions of the frame the slides are moved upon their guide-rods against the spiral springs, and each sleeve is moved outwardly along its associated finger and each finger and sleeve is forced against the horse's nostril, said fingers moving in opposite directions. This will so far check the breathing of the horse as to restrain him and make him manageable. When he is quiet, by releasing the controlling-lines the spiral springs will restore the parts to their original position, when the apparatus is ready for further use, should it be necessary. The frame and supporting-straps may be regarded as a head-gear, to which the operating mechanism is properly secured. In Fig. 2 the metallic portions are shown as covered with leather, and of course they could be covered or coated in any suitable manner. The band or strap or portion G is adapted to be or form a part of the bridle, and is secured by the strap passing up the forehead of the horse to the bridle or head-gear, so as to be thus held in position, the cross-piece J resting in the horse's mouth. The chains P P are connected with the cords L L; or the cords L L, if sufficiently strong, may be used instead of the chains, and the cords or chains, as the case may be, pass back to within reach of the driver. They preferably pass through the lines O O, the latter being made for that purpose, as indicated in Fig. 11. One good way of attaching the chain P to the line L would be to tie the end of the line L through the last link in the chain P.

I claim—

1. A horse-restraining device consisting of a nose-piece which comprises the nose-band, the nostril-compressors covered by the nose-band, and a mouth-piece connecting the nose-piece near its ends, and the controlling reins or lines connected with the compressors and extending back to a point within reach of the driver.

2. A horse-restraining device consisting of a bridle provided with a nose-band which comprises the band, nostril-compressors, and an adjustable mouth-piece, means for holding the mouth-piece securely in place after adjustment, and reins connected with the said compressors and extending back to a point within reach of the driver.

3. In a device for restraining horses, the combination of a head-gear with a frame passing about the horse's nose and carrying nostril-compressors, and a mouth-piece adjustably secured to the ends of such frame, such mouth-piece being provided with a set-screw and the frame with slots, whereby the mouth-piece may be adjustably secured upon the frame.

4. In a horse-restraining device, the combination of a head-gear having a nose-band with nostril-compressors thereon, hollow or tubular driving-lines, and controlling cords or lines connected with the compressors and passing through the lines to within reach of the driver.

5. In a horse-restraining device, the combination of a frame adapted to be secured about the horse's nose, with fingers on such frame inwardly movable and placed over the horse's nostrils, and a slide on such frame connected with each finger and adapted, when moved along such frame about the horse's nose, to force the fingers in, and lines from such slide to the driver's seat.

6. In a horse-restrainer, the combination of a head-gear with a frame arranged about the horse's nostrils, pivoted fingers supported by the said frame and arranged over the horse's nostrils, slides on the frame, connections between the slides and the finger, arranged to cause the motion of the slide to force the fingers against the horse's nostrils, such connections including sleeves on the fingers, which move inwardly thereon as the finger is moved inward, and fingers connecting the slides and the sleeves, and controlling-lines connected with the slide and under the control of the driver.

7. In a horse-restraining device, the combination of a head-gear with a frame, pivoted fingers over the horse's nostrils, sleeves on such fingers, slides, and connections from the slides to the sleeves, whereby when the slides are moved the sleeves are moved along the fingers and both the fingers and sleeves are forced in along the horse's nostrils, springs bearing upon the slides, and lines secured to the frames and passing in engagement with the slides to within reach of the driver.

FRED B. TYLER.

Witnesses:
FRANCIS W. PARKER,
WALTER J. GUNTHORP.